April 7, 1959   D. E. KEY ET AL   2,880,896
STORAGE BATTERY AND METHOD OF MAKING SAME
Filed Jan. 28, 1957   4 Sheets-Sheet 1
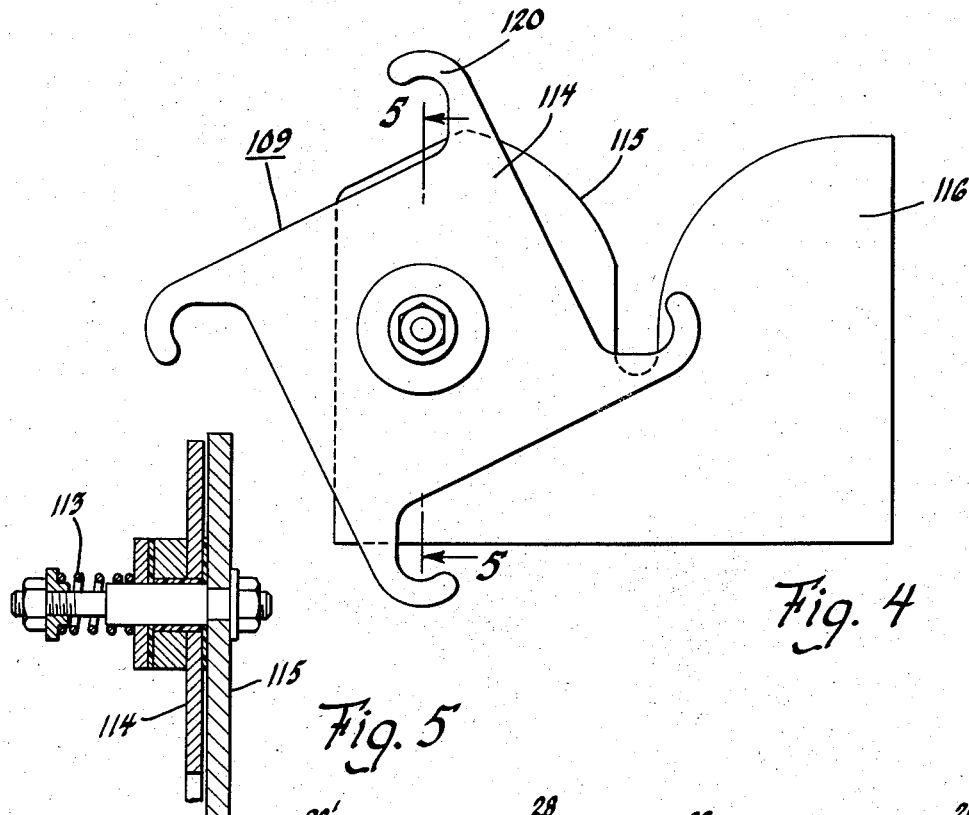
Fig. 4
Fig. 5
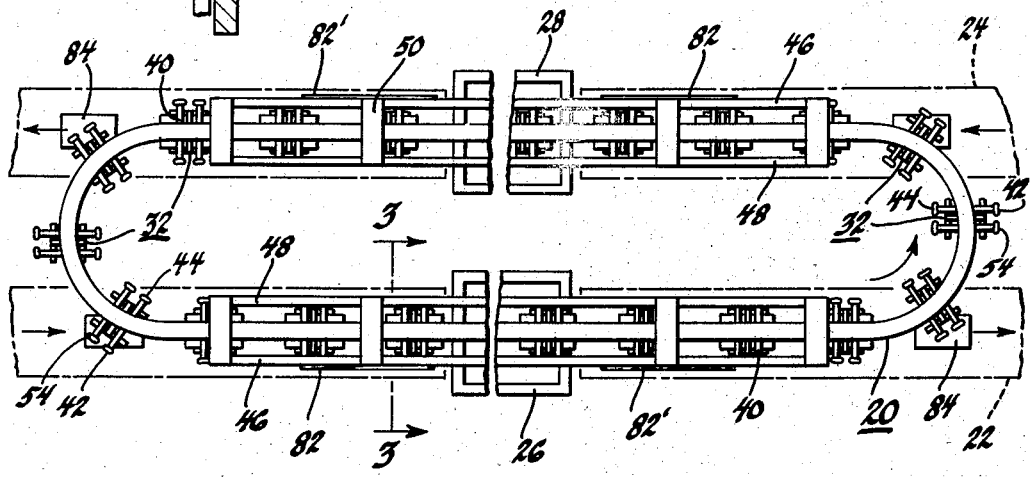
Fig. 1
INVENTORS
DON E. KEY
DONALD G. MAHONEY
BY
THEIR ATTORNEY

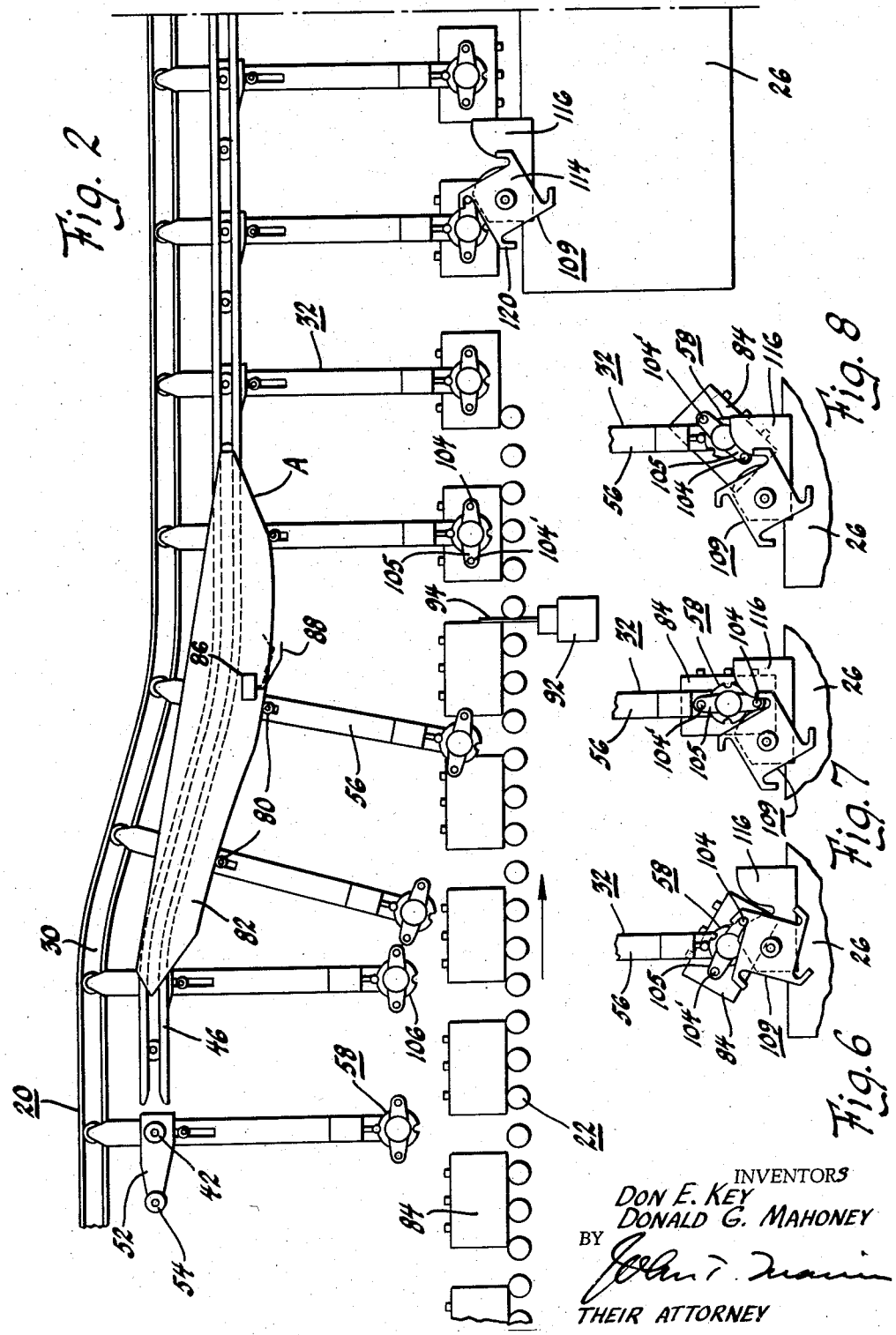

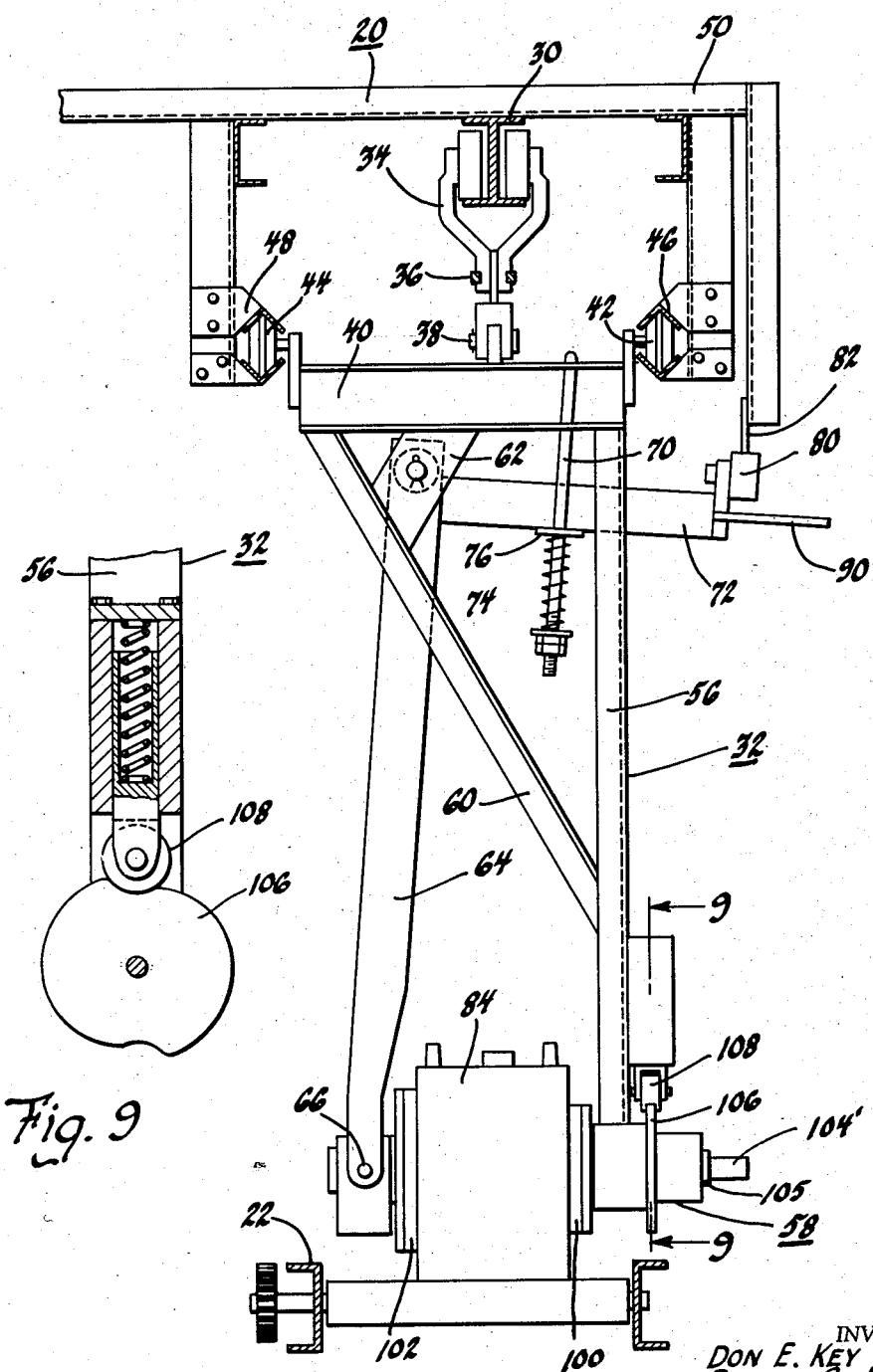

United States Patent Office 2,880,896
Patented Apr. 7, 1959

2,880,896

STORAGE BATTERY AND METHOD OF MAKING SAME

Don E. Key, Anderson, and Donald G. Mahoney, Muncie, Ind., assignors to General Motors Corporation, Detroit, Mich., a corporation of Delaware Application January 28, 1957, Serial No. 636,644

4 Claims. (Cl. 214—311)

This invention relates to storage batteries and is particularly concerned with methods and apparatus for removing electrolyte from batteries during and after charging and forming thereof.

It is, therefore, one of the objects of the invention to provide a method and apparatus for dumping storage batteries for removing the acid therefrom during the manufacture of the batteries.

In carrying out the above object, it is a further object to provide a conveyor system including a plurality of spring pressed arms which are automatically actuated to pick up a battery, means also being provided to invert the battery while it is held by said arms so that the electrolyte will flow therefrom, and means subsequently being provided for reestablishing the battery to its original position at which time the conveyor arms release the battery.

Another object of the invention is to provide a continuous trolley conveyor having a plurality of opposed pairs of spring pressed and automatically actuated arms wherein gripping means at the ends of the arms are rotatable, said gripping means and arms being automatically actuated to pick up batteries from a power driven conveyor in timed relation to the movement of the trolley conveyor, to convey the batteries to a dumping tank, to invert the batteries for causing the electrolyte to flow therefrom and to subsequently rotate the batteries to their original position and thereafter release the batteries to the power driven conveyor for moving the batteries to another station.

Further objects and advantages of the present invention will be apparent from the following description, reference being had to the accompanying drawings wherein preferred embodiments of the present invention are clearly shown.

In the drawings:

Figure 1 is a diagrammatic plan view of an endless trolley conveyor system showing two spaced power driven roller type conveyors operating in opposite directions for conveying material to the trolley conveyor.

Figures 2 and 2a are diagrammatic views of one side section of the trolley conveyor.

Figure 3 is a view of one pair of pick-up arms carried by the trolley conveyor and taken on line 3—3 of Figure 1.

Figure 4 is an enlarged view of the inverting or tip-over means.

Figure 5 is a fragmentary view showing the friction drag used in connection with the device shown in Figure 4.

Figures 6, 7 and 8 are progressive views of the tip-over device as it progresses through one complete cycle of operation to invert a battery.

Figure 9 is a sectional view of the cam release device taken on line 9—9 of Figure 3.

Figure 2A:
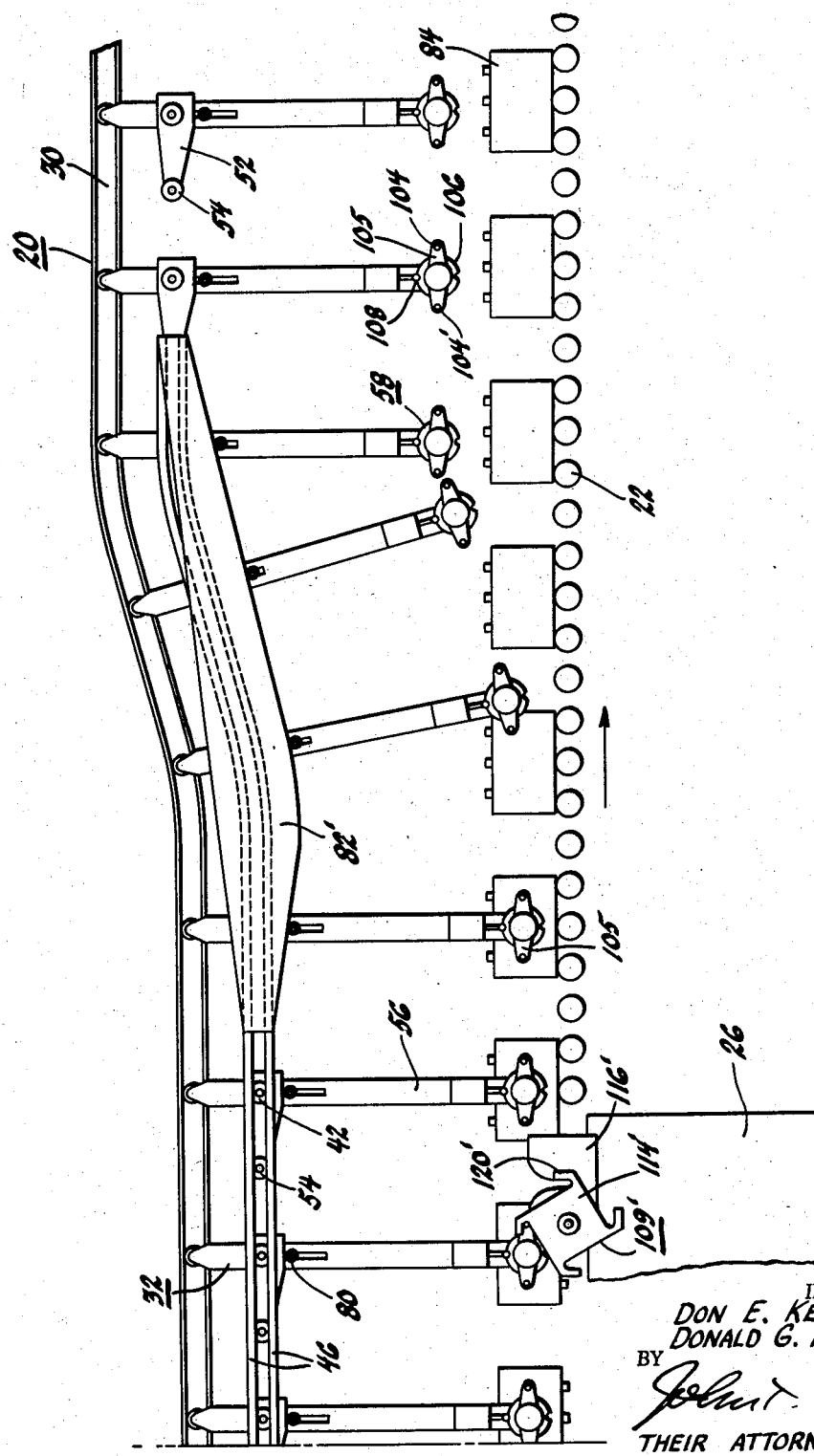

In the manufacture of lead-acid type storage batteries, the batteries are assembled with the cell groups therein and are then filled with battery acid and placed on a charging conveyor, for example, as shown in copending application S.N. 469,758, assigned to the assignee of the present invention.

While on this conveyor, the batteries are electrically connected, generally in series, to a source of power and a charging and forming current is passed therethrough while air is drawn around the batteries to maintain the temperature thereof below a predetermined maximum temperature. In this process, it is usual practice to dump the acid after a predetermined period of charging and to refill the cells with fresh acid and to then continue the charging. This operation has, in the past, been done manually wherein the batteries are inverted on a rack and permitted to drain into a tank beneath the rack whereupon the acid is adjusted to a given specific gravity and reused in a subsequent operation. The batteries are then righted and refilled with battery acid for the completion of the charging cycle. We have found that this particular step in the process of making lead-acid storage batteries requires considerable labor, is rather dangerous in its execution to the personnel involved and is very time consuming.

The present invention is directed to a method and machine for accomplishing the steps in an automatic manner whereby the batteries are processed in less time with less labor and to a higher degree of efficiency. To this end, a conveyor is used which is shown in a diagrammatic plan view in Figure 1. The conveyor is shown at 20 and is of an endless trolley type. Passing beneath the trolley conveyor 20 are two power driven roller type conveyors 22 and 24 which move in opposite directions. These conveyors are interrupted at their center portions by acid tanks 26 and 28, respectively, which tanks are lined with an acid resisting material such as lead or other suitable material and are provided with pumps, etc., not shown, for removing acid electrolyte as the level thereof reaches a predetermined height.

The trolley conveyor 20 is shown in greater detail in Figures 2 and 2a wherein one side of the conveyor is shown. The conveyor includes a central track 30 which carries a plurality of battery carrying fixtures 32. The battery carrying fixtures each comprise a trolley member 34 which runs on the track 30 and is moved therealong by means of a link chain 36. Hanging from the chain 36 by a hinge joint 38 is a cross member 40 which carries on opposite sides thereof a pair of rollers 42 and 44 which ride in tracks 46 and 48, respectively, carried between a main frame member 50 which also act as supports for the trolley track 30. Extending laterally from each pair of rollers 42 and 44 are arms 52, shown in Figure 2a, which carry additional rollers 54 thereon so that each fixture is more or less rigidly guided by the several tracks. Depending from the cross member 40 is a channel shaped member 56 which carries a portion of a clamping mechanism 58 at the lower end thereof. The member 56 is braced by means of angle brace 60 to the member 40. Pivotally carried by a cross brace 62 extending between brace 60 and member 40 is a second arm 64 somewhat similar in design to arm 56 and carrying at its lower end another portion of the clamping device 58 which is pivotally mounted thereto at 66. A bifurcated bar 70 passes over the member 40 and downwardly past a generally horizontally extending arm 72 rigidly attached to the arm 64. The bar 70 is threaded at its lower ends and carries a spring 74 on each portion thereof, which bears against a slidable plate 76 that is held resiliently against the arm 72. In this manner, the springs 74 act to constantly resiliently urge the arm 72 upwardly which tends to pivot the arm 64 about its pivot point and toward the arm 56. In this manner, the clamping device 58 always tends to be in closed or clamping position. This position is modified as will be explained hereinafter by means of a cam roller 80 at the outer end of the arm 72 which roller coacts with a cam track 82 under certain conditions to force the arm 72 downwardly for rotating the arm 64 away from the arm 56, when it is desired to release the clamping device.

A power driven roller conveyor 22 is shown diagrammatically in Figure 2 and carries thereon a plurality of storage batteries 84 thereon each filled with electrolyte. The conveyor causes the batteries to move toward the right which is the direction in which the trolley conveyor is also moving. It will be seen that the battery carrying fixtures at the left hand side of Figure 2 are above the batteries due to the position of the track 30 and then, as the track 30 bends downwardly, the battery carrying fixtures 32 also move downwardly so that the rollers 80 thereon contact the cam track 82. When this occurs, the arms 56 and 64 are spread and straddle a battery until the cam track 82 turns upwardly at "A." In this position, the roller 80 follows the cam track upwardly to permit the springs 74 to cause the arm 64 to move toward the arm 56. At this instance, a battery 84 is between the arms and, as the roller 80 leaves the cam track, the clamping device 58 embraces the battery. In order to insure that the batteries are properly spaced with respect to the fixtures 32, a trip switch, such as a microswitch 86, is adjustably mounted on the cam track and has an actuating lever 88 extending downwardly therefrom so as to be engaged by an outwardly extending pin 90 carried at the end of the arm 72. The microswitch 86, when tripped, will actuate a solenoid 92 which has a barrier 94 attached thereto that extends through the conveyor 22 and holds the battery 84 in position thereon until the solenoid 92 is energized by the closure of switch 86, whereupon the barrier 94 is pulled downwardly to permit the battery 84 to pass whereupon the battery is in the exact position for the battery carrying fixture 32 to embrace it. The position of the switch 86 can be changed so that this timing is completely accurate.

The clamping device 58 comprises two opposed soft rubber plates 100 and 102 each carried by shafts, not shown, which are preferably journalled in Teflon bearings. The rubber pads 100 and 102 are backed up by stainless steel plates which are attached to said shafts. On one side of the device 58, two spaced stub shafts 104 and 104' are provided on a plate 105, the function of which will be explained hereinafter. Thus, the pad portions of the clamping device are rotatable with respect to the battery carrying fixture. The shafts 104 and 104' extend outwardly from the fixture and are associated with a two lobe cam plate 106 that is yieldably held against movement by a spring pressed roller 108. As will be explained hereinafter, the position of the clamping device 58 is yieldably held in one of two positions 180° apart. After batteries are picked up from the power driven conveyor 22 by the battery carrying fixtures 32, they are inverted by a turn-over device 109 positioned at the end of the tank 26 and on one side thereof. The device 109 includes a turn-over cam 114 which is journalled and mounted on a generally Y-shaped cam track fixture 116 bolted to the tank. The cam 114 includes a friction clutch arrangement shown in Figure 5 which comprises a spring 113 pressing between the cam 114 and the cam plate 115 so that the cam moves only upon predetermined load applied to one of the four outwardly extending lobes 120 thereon. These lobes 120 are hook-like affairs which are positioned so as to engage the end of shaft 104 of the clamping device 58 as the battery and the carrier 32 move along the conveyor 20. Figures 6 through 8 show the several positions of the cam 114 and the position of the extension 104 as it moves along the cam track 116. As will be seen, the clamping device is rotated 180° through the action of the cam 114 and cam track 116 whereupon the cam 114 is automatically brought into position for the next battery while the battery that has just passed the cam 114 is held inverted over the tank as the conveyor 20 moves the battery lengthwise of the tank. The tank 26 is of sufficient length with respect to the speed of the conveyor to permit the battery to fully drain and, in this connection, if the conveyor is running in the order of 30 feet per minute, the tank is in the order of 30 feet in length whereby each battery is held in an inverted or draining position for approximately one minute. At the opposite side of the tank, as shown in Figure 2a, there is positioned another cam 114' and cam track 116' identical in all respects to cam 114 and cam track 116. This second cam 114' engages the shaft 104' which is at the other end of the bar that is attached to the central shaft for the pad 100 and reestablishes the battery in its upright position whereupon the conveyor track 20 begins to rise and a second cam track 82' engages the roller 80 of each fixture to spread the arms and cause the fixtures to release the battery onto the other section of the power driven conveyor 22 whereupon the battery moves outwardly as shown in Figure 1 to another processing station.

As noted in Figure 1, due to the use of the endless trolley conveyor 20, it is possible to use two power driven roller conveyors 22 and 24 operating in opposite directions so that two lines of batteries may use the same trolley conveyor 20 whereby the capacity of the device is doubled.

It will be understood that all parts of the conveyor system are made of acid resisting materials, for example, rubber and rubber coverings and lead are used where possible while the remaining parts are fabricated from stainless steel.

While the embodiments of the invention as herein disclosed constitute preferred forms, it is to be understood that other forms may be adopted.

What is claimed is as follows:

1. A device for emptying electrolyte from storage batteries by inverting the batteries and subsequently reestablishing them to their original position while the batteries are being conveyed from one position to another position, the combination comprising, a conveyor, a rotatable pick-up device moved by said conveyor, a second conveyor paralleling the first and within reach of said pick-up device, said second conveyor being adapted to move a battery therealong at the same rate as the pick-up device is being moved by the first conveyor, stop means for preventing movement of the battery until the pick-up device is in contiguous position therewith, means operated by the pick-up device when in said contiguous position for cancelling the effect of the stop means for permitting the battery to move with the device, means operated by the position of the pick-up device for then causing the pick-up device to grasp the battery and move it from the second conveyor, cam means adjacent to the second conveyor for causing the pick-up device to rotate through an arc of 180° for inverting the battery held thereby whereby the electrolyte is drained out of the battery, a second cam means spaced from the first cam means a distance sufficient to permit draining of the battery for reinstating the battery in its original position by rotating the pick-up device through an arc of 180°, and a second means operated by the position pick-up device for subsequently causing the device to release the battery onto the second conveyor.

2. In a device for automatically dumping electrolyte from a storage battery and subsequently reestablishing the battery to its original position, the combination comprising; a conveyor for moving a storage battery filled with electrolyte in a given direction and at a given rate of travel, pick-up means adapted to be moved simultaneously along a parallel conveyor above the first mentioned conveyor and at the same rate of travel, synchronizing means controlled by the moving pick-up means for bringing said battery on the first mentioned conveyor into position with respect to the moving pick-up means, cam means for thereafter causing the moving pick-up means to pick up the battery, a tank positioned at one end of the first mentioned conveyor, a tip-over device associated with the tank for operating on the pick-up means as it moves thereby and for causing the portion of the pick-up means which holds the battery to rotate through an arc of about 180° for inverting the moving battery over the tank whereby the electrolyte drains from the battery into the tank as the battery is moved longitudinally over the tank by the second mentioned conveyor, a second tip-over device associated with the tank at the other end thereof and adapted to operate on the pick-up means as it passes to rotate the said means and the moving battery through an arc of 180°, a third conveyor positioned parallel to and beneath the second conveyor and a second cam means for causing the moving pick-up means to release the battery onto said third conveyor whereby the empty battery is conveyed away from said tank.

3. The device claimed in claim 2 wherein the pick-up means comprises a pair of arms biased away from one another so as to be spaced apart a distance greater than the width of the battery and including rotatable pressure pads at the lower end thereof adapted to engage the battery, said first mentioned cam means causing said arms to be moved towards one another against said bias a distance sufficient for said pressure pads to engage and clamp the battery therebetween.

4. The device claimed in claim 1 wherein the pick-up means comprises a pair of arms biased away from one another so as to be spaced apart a distance greater than the width of the battery and including rotatable pressure pads at the lower end thereof adapted to engage the battery, said first mentioned means causing said arms to be moved towards one another against said bias a distance sufficient for said pressure pads to engage and clamp the battery therebetween.

References Cited in the file of this patent
UNITED STATES PATENTS

| | | |
|---|---|---|
| 822,604 | Hagen | June 5, 1906 |
| 1,290,675 | Stebler et al. | Jan. 7, 1919 |
| 2,249,659 | Kerns et al. | July 15, 1941 |